INVENTORS
Joseph F. Ziskal
John Higginson
Attorney

United States Patent Office 3,266,647
Patented August 16, 1966

1

3,266,647
SIDE-SHIFT BACKHOE
Joseph F. Ziskal, La Grange, Ill., and John Higginson, Doncaster, England, assignors, by mesne assignments, to Wain-Roy Corporation, Fitchburg, Mass., a corporation of Massachusetts
Filed May 3, 1965, Ser. No. 452,796
8 Claims. (Cl. 214—138)

This invention relates to tractors and to tractor-borne implements and more particularly to a side-shift backhoe or similar implement. In this field, it is frequently required to provide mounting means on a tractor, upon which can be attached an implement such as a backhoe, or some such implement which, having a boom or jib, is required to be shifted transversely of the tractor so as to be usable at one side or the other, or in an intermediate position. In the case of an earth-shifting implement such as a backhoe, the implement in working may re-act on the tractor upwardly, whilst its weight must be capable of being supported by the tractor in other conditions, or supported through the tractor by feet, which are usually adjustable, extended from the tractor.

The invention seeks to improve upon known mountings or attachments between tractors and implements of the character indicated, mainly by providing a very rugged structure lending itself to mounting on or building into the tractor; by enabling the centre of gravity of the implement to be brought nearer to the weight-carrying axle or the feet, by constructional simplification; if required by providing a housing for the enclosure and protection of parts of the assembly such as hydraulic pipelines; and by the provision of simple and easy means of attachment of the implement and for its lateral re-positioning.

According to the invention there is provided as a mounting or attachment of an implement of the indicated character and the tractor, a transverse beam structure comprising horizontally spaced parallel tracks extending substantially across one end of the tractor, and providing on the implement a complementary fitting to be movable along and lockable relatively to said beam structure and such as to re-act against the tracks upwardly and downwardly according to whether the implement, overhanging from the tractor, exerts upward or downward load.

Preferably the beam structure comprises a robust cylindrical tube rigidly fixed to the tractor, and this has horizontally spaced flanges or ribs, extending along its length and projecting radially of the tube to which the ribs are attached (or the ribs may be formed integrally with the tube), whilst the complementary fitting embraces the tube and is slidable along it when not locked. Consequently the fitting may comprise itself a tubular body with internal grooves to mate with the ribs; or it may comprise two semicylindrical saddle-like portions assembled so as to form a virtually cylindrical body with gaps between their adjacent edges which gaps, in effect, form the grooves.

In the case of such a fitting as above indicated, the saddle portions may be nipped tightly on the tube and/or ribs, for the purpose of locking the fitting (and the implement) against sliding. Or, the fitting may be locked by bolts or pin means passing through it and through the tube and/or ribs.

While a tube formation has advantages especially as to weight and torsional stiffness, the beam may be of other section, and it is not essential to the invention that there be a single beam, since the beam structure may comprise separate elements (they may for example be two parallel tubes) spaced horizontally.

Antifriction means may be provided between the tracks and the implement fitting. Also power-operated means may be provided to achieve lateral positioning.

In an alternative construction a tubular beam is provided as above, and it has longitudinal grooves formed parallel to each other and in the horizontal diameter of the tube. In this case the fitting has complementary ribs projecting inwardly and radially, to bear in the grooves.

In yet another construction, especially if the main reaction between tractor and implement has to be met in one sense of torque only, the beam may again be tubular and it is reinforced by having attached to it externally, arcuately-sectional plates extending its length, and presenting radial edges (i.e. surfaces equal to their thickness) which act as the tracks.

The invention further includes a construction in which the implement comprises a fork-like part which is pivotally attached to the above-mentioned complementary fitting about a vertical axis passing through the horizontal dimension of the beam. By this arrangement the centre of gravity of the implement as a whole may be disposed nearer to that of the tractor, so that there is in effect less overhung weight and a better distribution of loads than in previous constructions.

The tubular beam if employed, may house hydraulic lines or other parts involved in the operation of the implement, parts involved in the use or operation of supporting feet, or—as for transport—legs to which feet are attached may be housed by lying within the tube, by way of stowage. In any case such legs may be attached to the beam so that they do not need to be independently attached to the tractor itself.

An object of this invention is to provide a side-shift backhoe supported on horizontally spaced slideways.

A further object of this invention is to provide a side-shift backhoe to be mounted on a tractor such that its centre of gravity is close to the tractor's centre of gravity.

These and other objects of the invention will become more apparent from the specification and drawings wherein.

Figure 1:
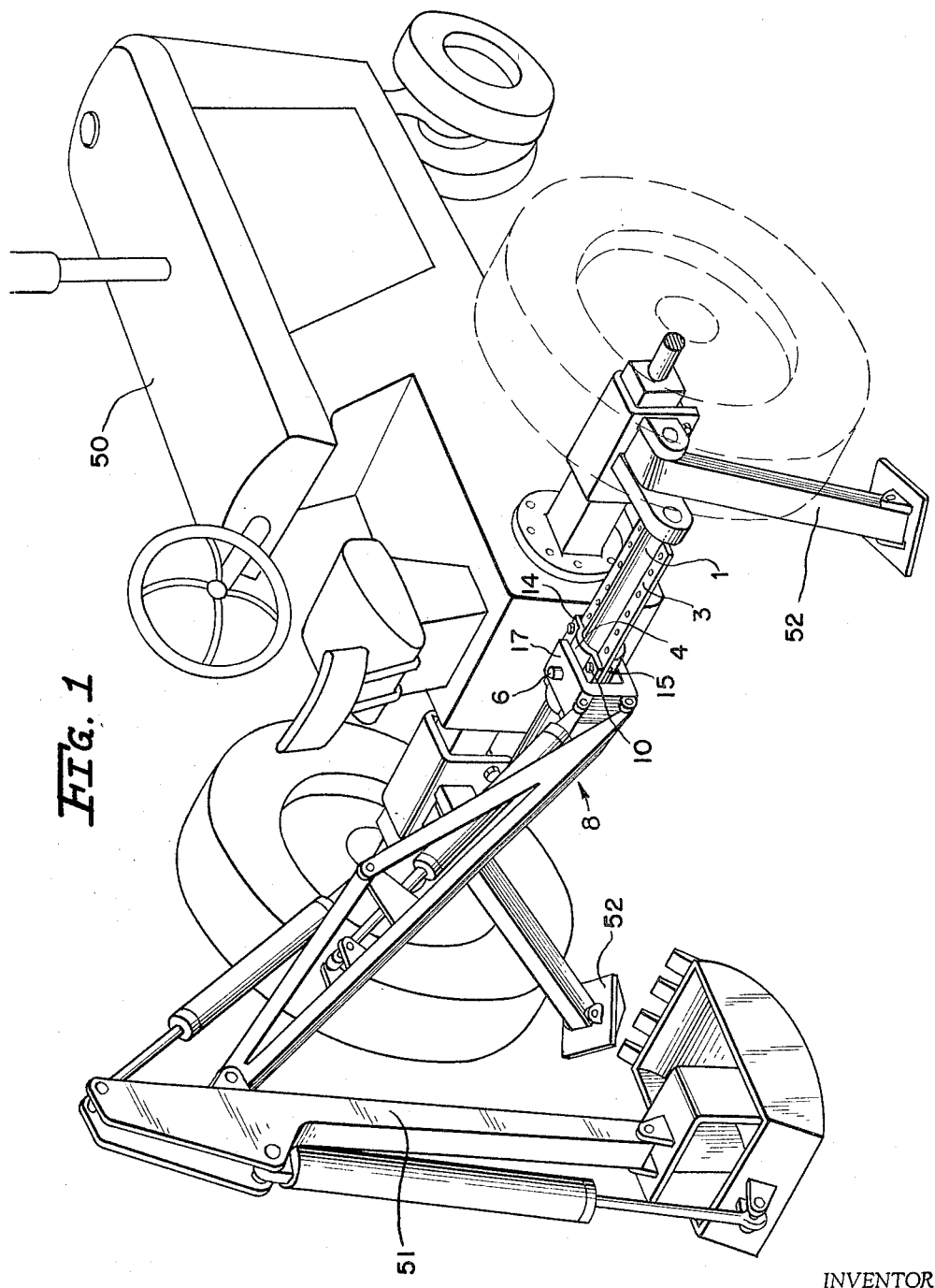
FIG. 1 represents a tractor having the side-shift backhoe mounted thereon.

In FIG. 1 there is shown a tractor 50 having a backhoe generally designated 51 mounted on the rear of the tractor. Support legs 52 are shown which function when using the backhoe to stabilize the machine.

Figure 2:
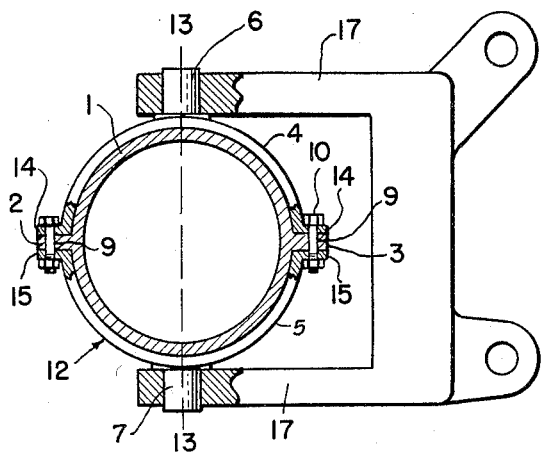
FIG. 2 represents a section through a cylindrical beam having laterally extending tracks.

In FIG. 2 there is shown a frame formed of a hollow cylindrical beam 1. This is very robustly attached to or built into the structure of the tractor, at its ends, so as to resist both vertical loads and torsion. This tubular beam 1, has two horizontally and radially extending ribs 2, 3, these may be welded to the tube 1, and they extend lengthwise. At locations where the boom is to be locked, holes 9 are drilled in the ribs which are adapted to receive bolts 10. Surrounding the tube 1 is a complementary fitting generally designated 12 formed by two practically semi-cylindrical shells 4 and 5. These are flanged as at 14, 15 and fit closely around the tube 1, with the flanges 14, 15 sandwiching the flanges 2 and 3 and being drilled for the bolts, which when tightened consequently lock the fitting 4, 5 to the tube 1, preferably with a tight frictional grip and with the flanges in contact.

The shell 4 has an upstanding pivot trunnion 6 and the shell 5 a downward trunnion 7, this being coaxial on a vertical axis 13—13 and bearing the bifurcated ends 17 of a boom 8. The bifurcation has sufficient depth to permit the boom to be swung horizontally through the angle required of it and, preferably, so that when the fitting 4, 5 is in an extreme end position of location, the boom can be swung around the end of the beam. In this example it will be appreciated that (the axis of the trunnions being centred in the beam) the centre of gravity of the boom and implement can be substantially nearer to that of the tractor than if the pivot of the boom is (as is usual) rearwardly overhung.

Figure 3:
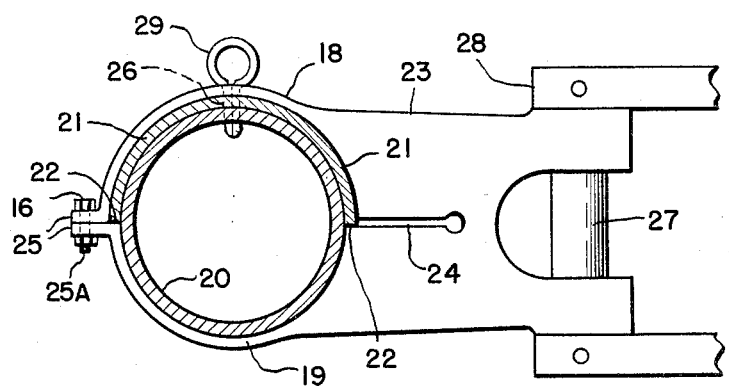
FIG. 3 represents a section through a cylindrical beam having tracks formed by laterally extending edges.

In FIG. 3, there is a tubular beam 20 and this is reinforced by segmented-cylindrical outer elements 21 which are welded to it. The elements 21 have radially horizontally extending edges at 22. The boom fitting in this case comprises the element 23, which is bifurcated in two semi-cylindrical arms 18, 19 and is slit as at 24 to afford some resilience. The forward edges of the arms 18, 19 have complementary flanges at 25, drilled to receive bolts 16. Holes 26 are provided for "drop in" studs 29 to lock the fitting in its locations, to the beam. The element 23 is shown as having a vertical pivot at 27 for the forked ends 28 of a boom. The arms 18, 19 are nipped onto the tube 20 (and element 21) by the bolts 16 and the edges of the arm 19 which is of smaller diameter than arm 18 abut against the edges 22 which can therefore form tracks when the fitting is being re-located along the beam.

Figure 4:
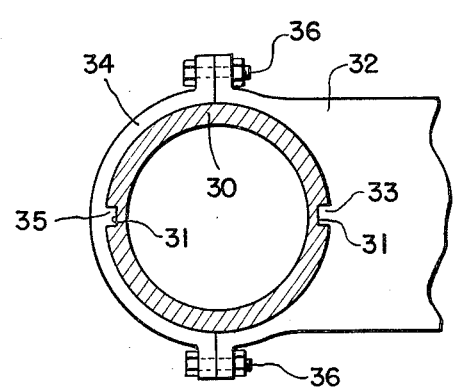
FIG. 4 represents a section through a cylindrical beam having laterally spaced tracks formed as grooves.

In FIG. 4, a tube 30 forms the beam and is formed with track grooves 31 which extend lengthwise and in depth are radial and horizontal. The boom fitting represented at 32, is formed in semi-cylindrical manner complementary to tube 30 and has a radially directed rib or feather at 33 to engage the rearward track 31. A similarly semi-cylindrical cap 34 with a similar rib 35 is attached to, and tightened on, or loosened from, the fitting 32 by bolts 36.

Figure 5:
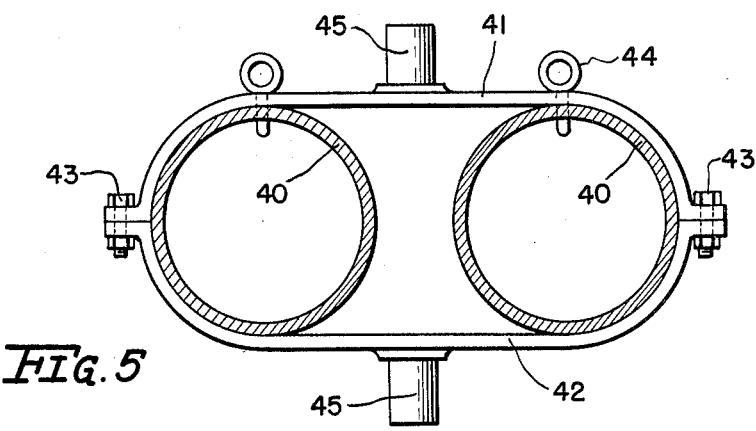
FIG. 5 represents a section through a beam structure formed of two cylindrical beams.

In FIG. 5 two horizontally spaced tubes 40 are fixed to the tractor and are parallel, and spaced horizontally. A fitting shaped internally to be complementary to the beam structure formed by the tube 40, comprises an upper half 41 and lower half 42, these being interattached and nipped on the tube 40, by bolts 43. Locking studs 44 are dropped through holes formed in tubes 40 and the upper half 41 of the fitting for the purpose of locating the fitting in a selected position with respect to the tubes 40. The halves 40, 41 present upward and downward trunnions 45 to fulfill the same function as trunnions 6, 7 of FIG. 2.

Within the tube of FIGS. 2, 3 or 4 or between the tubes of FIG. 5, there may be housed pipelines or other parts required in operation of the implement. Or, legs to bear with feet on the ground, may be stowed therein. In any of the examples, legs may be directly attached to the beam structure, to obviate the need to attach them to the other structure of the tractor.

What is claimed is:

1. An earthworking vehicle for mounting a backhoe assembly comprising in combination:
    a pair of ground-engaging wheels at one end of said vehicle;
    a transversely extending frame mounted on said vehicle and formed of an elongated tubular member, radially extending ribs protruding outwardly from said tubular member in a horizontal plane forming horizontally spaced guideways extending over the length of said frame;
    a fitting having horizontally spaced guideways adapted to engage and slide upon said frame guideways;
    means for locking said fitting in a selected adjusted position on said frame with said frame and fitting guideways in abutting engagement; and
    said backhoe assembly being pivotally supported on said fitting for horizontal swinging movement.

2. An earthworking vehicle for mounting a backhoe assembly comprising in combination:
    a pair of ground-engaging wheels at one end of said vehicle;
    a transversely extending frame mounted on said vehicle and formed of an elongated tubular member, radially extending grooves formed in the peripheral surface of said tubular member about a horizontal plane forming horizontally spaced guideways extending over the length of said frame;
    a fitting having horizontally spaced guideways adapted to engage and slide upon said frame guideways;
    means for locking said fitting in a selected adjusted position on said frame with said frame and fitting guideways in abutting engagement; and
    said backhoe assembly being pivotally supported on said fitting for horizontally swinging movement.

3. An earthworking vehicle for mounting a backhoe assembly comprising in combination:
    a pair of ground-engaging wheels at one end of said vehicle;
    a transversely extending frame mounted on said vehicle and formed of an elongated tubular member, segmented-cylindrical elements secured to the peripheral surface of said tubular member, said segmented-cylindrical elements including radially extending horizontal edges forming horizontally spaced guideways extending over the length of said frame;
    a fitting having horizontally spaced guideways adapted to engage and slide upon said frame guideways;
    means for locking said fitting in a selected adjusted position on said frame with said frame and fitting guideways in abutting engagement; and
    said backhoe assembly being pivotally supported on said fitting for horizontal swinging movement.

4. An earthworking vehicle for mounting a backhoe assembly comprising in combination:
    a pair of ground-engaging wheels at one end of said vehicle;
    a transversely extending frame mounted on said vehicle and formed of a pair of elongated tubular members arranged in a horizontal plane, the outer surface of said pair of elongated tubular members forming horizontally spaced guideways extending over the length of said frame;
    a fitting having horizontally spaced guideways adapted to engage and slide upon said frame guideways;
    means for locking said fitting in a selected adjusted position on said frame with said frame and fitting guideways in abutting engagement; and
    said backhoe assembly being pivotally supported on said fitting for horizontal swinging movement.

5. The invention as set forth in claim 1 wherein said frame is confined to the area between said ground-engaging wheels.

6. The invention as set forth in claim 2 wherein said frame is confined to the area between said ground-engaging wheels.

7. The invention as set forth in claim 3 wherein said frame is confined to the area between said ground-engaging wheels.

8. The invention as set forth in claim 4 wherein said frame is confined to the area between said ground-engaging wheels.

References Cited by the Examiner
UNITED STATES PATENTS
3,155,250   11/1964   French et al. _____ 214—138
FOREIGN PATENTS
1,169,734   9/1958   France.
1,310,448   10/1962   France.

HUGO O. SCHULZ, *Primary Examiner.*